United States Patent [19] [11] 3,979,180
Lorand [45] Sept. 7, 1976

[54] STABILIZED CROSSLINKED POLYETHYLENE AND ETHYLENE-VINYL ACETATE

[75] Inventor: George E. Lorand, Cincinnati, Ohio

[73] Assignee: National Distillers and Chemical Corporation, New York, N.Y.

[22] Filed: Sept. 12, 1975

[21] Appl. No.: 612,891

[52] U.S. Cl. .................... 260/23 H; 260/42.29; 260/45.75 G; 260/45.7 PS; 260/45.9 QB; 260/45.95 R
[51] Int. Cl.² .................................... C08J 3/20
[58] Field of Search ............. 260/45.9 QB, 45.75 R, 260/45.7 PS, 23 H, 42.29, 45.75 G, 45.95 R

[56] References Cited
UNITED STATES PATENTS

| | | | |
|---|---|---|---|
| 2,984,634 | 5/1961 | Caldwell et al. | 260/23 H |
| 3,017,376 | 1/1962 | Bafford et al. | 260/23 H |
| 3,148,936 | 9/1964 | Turbak | 260/45.75 G |
| 3,454,510 | 7/1969 | Newland et al. | 260/23 H |
| 3,655,559 | 4/1972 | Holt | 260/45.9 QB |
| 3,867,324 | 2/1975 | Clendinning et al. | 260/23 H |

Primary Examiner—V.P. Hoke
Attorney, Agent, or Firm—Kenneth D. Tremain

[57] ABSTRACT

Low density polyethylene and mineral-filled ethylene vinyl acetate copolymers are stabilized by using an anti-oxidant combination of a hindered phenol and/or a substituted diphenyl amine, a metal organic thiophosphorus compound and a trace amount of a transition metal salt.

20 Claims, No Drawings

STABILIZED CROSSLINKED POLYETHYLENE AND ETHYLENE-VINYL ACETATE

BACKGROUND OF THE INVENTION

The use of anti-oxidants in the polymer industry is of major importance because they extend the polymer's useful temperature range and service life. Anti-oxidants are substances which when added in small proportions to the polymer, retard its degradation due to oxidation at ambient and elevated temperatures by opposing or inhibiting reactions promoted by oxygen or peroxide. In finished polymer products, protection against oxidative deterioration is required in order to maintain the original properties of the composition. In selecting a suitable anti-oxidant for a polymer system, various factors must be considered such as polymer structure, impurities in the polymer such as metal contaminants from raw materials or the catalyst used to produce the polymer, the end use of the polymer, and finally, the presence of fillers and various ancillary compounding materials.

Oxidation of polymers is normally caused by the internal formation of free radicals and since hydroperoxides are usually the most important source of these free radicals, it is desirable to decompose the hydroperoxide free radicals to nonradical products and thus destroy or inhibit the oxidation process. Many compounds have been found to inhibit oxidation by destroying organic peroxides or hydroperoxides, among which are the mercaptans, sulfides, sulfones, phenols and salts of dithiocarbamic and dithiophosphoric acids.

It has also been known in the past to employ two or more anti-oxidants simultaneously in a polymer in order to achieve a synergistic effect, i.e., the combined effect of the two anti-oxidants will be greater than that of either one at a level equal to their concentration in the polymer. As an example, in the stabilization of polyolefins, particularly polypropylene, a synergistic anti-oxidant action occurs between phenols such as 2,6-di-tertiary-butyl-4-methylphenol and sulfides such as dilauryl-3,3'-dithiodipropionate in which the sulfide acts as a peroxide decomposer and the phenol acts as a free radical interceptor.

The prior art is replete with patents teaching combinations of anti-oxidant materials. Examples include Kuckro et al. (U.S. Pat. No. 3,819,410) which teach the combination of a hindered phenol and a zinc dialkyl dithiophosphate, Holt (U.S. Pat. No. 3,655,559) which teaches the combination of a hindered phenol, alkylated aromatic amine, dithiophosphite and a metal salt of a chelating agent. Kauder (U.S. Pat. No. 3,458,472) teaches stabilizing polyvinyl chloride with a cyclic crystalline organo tin compound, hindered phenol, aromatic amine, alkaline earth metal stearate and mercapto acid salt. Brnachesi, (U.S. Pat. No. 3,622,530), Stretanski (U.S. Pat. No. 3,763,066), Koenen et al. (U.S. Pat. No. 3,779,962), Anderson et al. (U.S. Pat. No. 3,755,450) and Jennings et al. (U.S. Pat. No. 3,764,571) teach the use of various stearates in anti-oxidant combinations. Sommerville et al. (U.S. Pat. No. 2,802,811) teaches the use of the zinc salt of 2-mercaptobenzothiazole as an anti-oxidant.

It is the object of this invention to provide a new synergistic combination of anti-oxidants which greatly improves the heat stability of peroxide cured vulcanizates of unfilled low density polyethylene or mineral-filled ethylene-vinyl acetate copolymer compositions without any undesirable staining of the composition. This and other objects of the invention will become apparent to those skilled in the art from the following detailed description.

SUMMARY OF THE INVENTION

This invention relates to new synergistic anti-oxidant, non-staining polymer compositions and more particularly to a new composition for either unfilled low density polyethylene or mineral-filled ethylene-vinyl acetate and an anti-oxidant combination of a hindered phenol and/or substituted diphenyl amine, metal organic thiophosphorus compound and a trace amount of a transition metal salt such as the stearates of cobalt, iron, manganese and nickel and the trivalent chromium salt of 2-mercaptobenzothiazole.

DESCRIPTION OF THE PREFERRED EMBODIMENTS

The polymers to which the new synergistic anti-oxidant compositions of the instant invention are applicable are low density polyethylene and ethylene-vinyl acetate copolymers. These polymers are well known in the art. The low density polyethylene is that manufactured by the high pressure process and in general has a density of about 0.91 to 0.94. The polyethylene is used as an unfilled polymer and the ethylene-vinyl acetate is mineral-filled with the typical mineral fillers such as silica, carbon black, clay, calcium carbonate, magnesium carbonate, and the like.

The polymers are crosslinked into cured vulcanizates by the use of one or more organic peroxides. Such organic peroxides are characterized by having each of the peroxide-oxygen atoms directly linked to a tertiary carbon atom and by substantially decomposing at temperatures in excess of 130°C. The peroxides are of the formula R-O-O-R in which each R is individually selected from the group consisting of

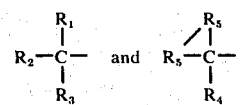

wherein $R_1$, $R_2$, $R_3$ and $R_4$ comprise alkyl radicals, cycloalkyl radicals, alkyl cycloalkyl radicals, cycloalkyl alkyl radicals, aryl radicals, and aralkyl radicals. The unit

is a radical where the tertiary carbon attached to the peroxide oxygen is contained within a hydrocarbon cyclic radical structure such as cyclopropyl, cyclohexyl, etc., an example of which is di-phenyl cyclohexyl peroxide. Typical examples of the tertiary peroxides include di-α-cumyl peroxide, p-butyl-α-cumyl peroxide, di-t-amyl peroxide, 2,5-bis(t-butyl peroxy-2,5-dimethyl)hexane and 2,5-bis(t-butyl peroxy-2,5-dimethyl)hexyne. The peroxides are described in much greater detail in U.S. Pat. Nos. 2,888,424 and 3,296,189, the disclosures of which are hereby incorporated by reference.

The proportion of peroxide used depends on the final properties sought in the cured material. Typically, an amount of 1–10 weight percent based on the weight of the polymer is satisfactory and preferably about 2% is used. If desired, mixtures of peroxides can also be used.

The anti-oxidant composition employed in the instant invention is a combination of (a) a hindered phenol and/or substituted diphenyl amine, (b) a metal organic salt of thiophosphorus acid and (c) a trace amount of a transition metal salt. The combination of (a) and (b) have been employed before the present invention.

The hindered phenols employed in the present invention are the conventional phenolic anti-oxidants and include alkylated phenols and bisphenols. The alkylated phenols usually contain up to 3 alkyl groups, which can be the same or different, each of which contains 1–24 carbon atoms. Examples of such compounds include 2,6-dioctadecyl-p-cresol, 2,4,6-trimethyl phenol, 2,4,6-triisopropyl phenol, 2,4,6-tri-t-butyl phenol, 2,6-di-t-butyl-4-methyl phenol, 2-t-butyl-4,6-dimethyl phenol, 2,6-methyl-4-didodecyl phenol, and the like.

The bisphenols are characterized by the formula

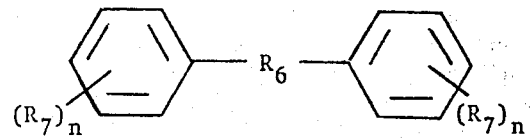

in which $R_6$ is alkylene of 1–5 carbon atoms, ether or thioether, $R_7$ is alkyl of 1–12 carbon atoms and $n$ is an integer of from 1–3. When more than one $R_7$ substituent is present on a phenyl moiety, each of the $R_7$ can be the same or different. Exemplary of such bisphenols are 2,2'-methylene-bis(5-isopropyl phenol), 2,2'-methylene-bis(4,-methyl-6-t-butyl phenol), 2,2'-isopropylidene-bis(5-methyl phenol), 4,4'-methylene-bis(2-methyl-6-t-butyl phenol), 2,2'-isopropylidene-bis(4-nonyl phenol), 1,1'-thiobis-2-naphthol), bis(3,5-di-t-butyl-4-hydroxybenzyl)ether, and the like.

The diaryl amines employed in the instant invention have the structure Ar-NH-Ar' where Ar and Ar' can each be phenyl, naphthol and substituted phenyl and naphthol, including alkyl substituents having 1–20 alkyl carbon atoms, and halogen substituents. Such compounds include diphenyl amine, dinaphthol amine, N-phenyl-1-naphthol amine, N-phenyl-2-naphthol amine, and the like. The aryl amines are also described in the Second Edition of the Kirk-Othmer Encyclopedia of Chemical Technology, Vol. 2, pg. 600.

In the anti-oxidant compositions of the present invention, either the hindered phenol or the diaryl amine, or a combination of both in any desired proportion can be employed.

The metal organic thiophosphates employed in the present invention are well known in the industry and include the salts of dialkyl dithiophosphates. The metal is a polyvalent metal such as an alkaline earth metal or a salt forming metal, e.g., nickel, aluminum, cadmium, tin, zinc, magnesium, calcium, strontium, barium and the like. Illustrative of the class of salts dialkyl (each alkyl containing 3–12 carbon atoms) dithiophosphates are salts of: dibutyl dithiophosphoric acid, diamyl dithiophosphoric acid, di-(4-methylpentyl-2)dithiophosphoric acid, di-(2-methylpentyl-1)dithiophosphoric acid and the like. A preferred thiophosphate is zinc dialkyl dithiophosphate.

The transition metal salts employed in the anti-oxidant compositions of the instant invention are the divalent transition metal salts of stearic acid, specifically cobalt stearate, iron stearate, manganese stearate and nickel stearate, and the trivalent chromium salt of 2-mercaptobenzothiazole which has the formula

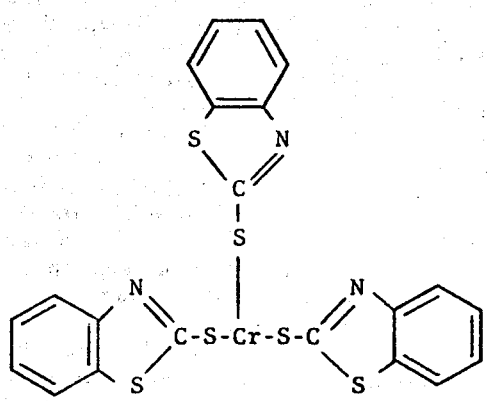

The transition metal salts can be prepared by conventional means. For example, the transition metal stearates can be prepared by adding a 10% aqueous solution of the desired transition metal in salt form, e.g., halide, nitrate or sulfate, slightly in excess of the theoretical molar ratio of 1:2 dropwise with stirring to a hot dilute (about 2.5%) aqueous solution of sodium stearate. The copious precipitate is allowed to stand overnight, isolated by suction filtration and then washed thoroughly with hot distilled water to ensure removal of any residual metal ions. The washed precipitate is then air-dried overnight and further dried in a vacuum oven at 60°C. The chromium salt can be prepared by adding a dilute solution (about 3%) aqueous, of chromium sulfate dropwise with stirring to a 10% aqueous solution of the sodium salt of mercaptobenzothiazole, slightly in excess of theoretical molar ratio of 1:3. The precipitated chromium salt is then recovered in the same manner as the transition metal stearate.

The anti-oxidant composition of the instant invention is generally used in amounts of about 0.5 to 1.95 parts per 100 parts of the polymer. More of the composition should be used when the polymer is ethylene-vinyl acetate. Thus, it is preferred to use about 0.5 to 1 part of anti-oxidant, most preferably about 0.8 part, when the polymer is the low density polyethylene and it is preferred to use about 1.05 to 1.95 parts anti-oxidant composition, preferably about 1.5 parts, when the polymer is ethylene-vinyl acetate.

Only trace amounts of the transition metal salt are employed. In general, about 1 to 100 parts per million parts of the polymer are employed. As with the total amount of anti-oxidant composition, it is preferred to employ more of the transition metal salt when the polymer is ethylene-vinyl acetate than when it is polyethylene. Thus, it is preferred to use 1 to 50 parts per million when the polymer is polyethylene and 5 to 100 parts when the polymer is ethylene-vinyl acetate. The preferred amount of transition metal salt when the stearate salts are used is about 10 to 20 parts per million, preferably about 15 parts per million when the polymer is polyethylene, and about 25 to 35, most preferably about 30 parts per million when the polymer is ethylene-vinyl acetate. With respect to the chromium salt, it is preferred to use about 7 to 13, most preferably about 10 parts per million when the polymer is polyethylene and about 15 to 25, most preferably about 20 parts per million when the polymer is ethylene-vinyl acetate.

The balance of the anti-oxidant composition comprises the hindered phenol and/or diaryl amine and the metal organic thiophosphate. In general, the weight ratio of hindered phenol and/or diaryl amine to the metal organic thiophosphate is about 1:5 to 5:1. When the polymer is polyethylene, the preferred weight ratio is about 1:3 and when the polymer is ethylene-vinyl acetate, the preferred weight ratio is 1:1 to 2:1.

The various components of the polymer compositions of this invention can be prepared by simply mixing the various ingredients. The order of mixing and specific procedure employed are not critical except to the extent that from the time the peroxide is added, the temperature must not exceed 130°C. in order to prevent premature curing of the composition. This precaution, however, is conventional in the art.

It is preferred to form the polymer compositions of this invention by first preparing a masterbatch of the polymer and the anti-oxidant compositions. The masterbatch and peroxide are then added to the polymer either on a two-roll mill or in an internal mixture such as a Banbury mixer.

Without being limited to theory, it is believed that the hindered phenol and/or diaryl amine donate hydrogen atoms to the polymeric $RO_2$. free radicals formed in the oxidation of the polymer. This reaction forms the non-radical hydroperoxide ROOH and an anti-oxidant free radical A. which in turn reacts with another $RO_2$. free radical, forming the non-radical product $RO_2A$. The metal organic dithiophosphate component contributes to the prevention of the oxidative degradation of the polymer by destroying the hydroperoxide formed initially in the polymer oxidation reaction and also the ROOH formed as a result of interaction between the hindered phenol and/or diaryl amine and the $RO_2$. free radical. It is also believed that the transition metal salt also contributes to the prevention of oxidative degradation of the polymer by catalyzing the non-radical heterolytic decomposition of the ROOH hydroperoxide.

In order to further illustrate the present invention, various Examples are set forth below. It will be understood that throughout this specification and claims, all parts and percentages are by weight and all temperatures in degrees Centigrade unless otherwise specified.

EXAMPLE 1

Masterbatches of the transition metal salts were first prepared in polyethylene homopolymer and in ethylene-vinyl acetate copolymer. Typically the masterbatches were prepared by charging 1200 parts by weight of the polymer and 1.2 parts by weight of the transition metal salt into a Banbury mixer and mixing them at a temperature of about 120°C. for a period of about 3–5 minutes. The hot mix was then dumped into a pan and immediately transferred to a two roll rubber mill which had been set at a temperature of about 90°C. After several passes, the mixture was sheeted from the mill as approximately ¼ inch thick crepe. Masterbatches prepared in this manner contained 1 part by weight of transition metal salt per 1000 parts of polymer.

Compositions of this invention were then prepared by charging 1200 parts of the polymer, 2.4 parts of 2,6-dioctadecyl-p-cresol, 7.2 parts of zinc dialkyl dithiophosphate (Lubrizol 1060) and the appropriate number of parts of the masterbatch, depending on the desired concentration of transition metal salt, into a Banbury mixer. The temperature of the Banbury rotors was brought up to the desired setting of about 100° C. and the mixture was mixed for 1 to 2 minutes. The temperature was then raised to about 125° C., mixed for 1 minute, dropped back to about 100° C. and 18 parts of the peroxide ($\alpha,\alpha'$-bis(tert-butyl peroxy)diisopropyl benzene) was added and mixing continued for an additional 1–2 minutes. At the end of the mixing cycle, the compositions were dumped from the Banbury mixer and worked up in the same manner described with respect to the masterbatch above.

The following Tables show the full compositions of the mixtures prepared and their resulting physical properties.

FORMULATIONS

| CONTROL A | Parts |
|---|---|
| Low density polyethylene (nominal melt index) | 100.00 |
| 2,6-dioctadecyl-p-cresol | 0.20 |
| zinc dialkyldithiophosphate | 0.60 |
| $\alpha$-$\alpha'$-bis(tert-butylperoxy)diisopropylbenzene | 1.50 |
| Total | 102.30 |

EXAMPLE 1

| | Parts |
|---|---|
| Low density polyethylene (nominal melt index) | 100.00 |
| 2,6-dioctadecyl-p-cresol | 0.20 |
| zinc dialkyldithiophosphate | 0.60 |
| manganese stearate masterbatch (for concentration of 10 parts manganese stearate per million parts polyethylene) | 1.00 |
| $\alpha$-$\alpha'$-bis(tert-butylperoxy)diisopropylbenzene | 1.50 |
| Total | 103.30 |

EXAMPLE 2

| | Parts |
|---|---|
| Low density polyethylene (nominal melt index) | 100.00 |
| 2,6-dioctadecyl-p-cresol | 0.20 |
| zinc dialkyldithiophosphate | 0.60 |
| chromium salt of mercaptobenzothiazole masterbatch (for concentration of 10 parts chromium salt of mercaptobenzothiazole per million parts polyethylene) | 1.00 |
| $\alpha$-$\alpha'$-bis(tert-butylperoxy)diisopropylbenzene | 1.50 |
| Total | 103.30 |

EXAMPLE 3

| | Parts |
|---|---|
| Low density polyethylene (nominal melt index) | 100.00 |
| 2,6-dioctadecyl-p-cresol | 0.20 |
| zinc dialkyldithiophosphate | 0.60 |
| cobalt stearate masterbatch (for concentration of 15 parts cobalt stearate per million parts polyethylene) | 1.50 |
| $\alpha$-$\alpha'$-bis(tert-butylperoxy)diisopropylbenzene | 1.50 |
| Total | 103.80 |

EXAMPLE 4

| | Parts |
|---|---|
| Low density polyethylene (nominal melt index) | 100.00 |
| 2,6-dioctadecyl-p-cresol | 0.20 |
| zinc dialkyldithiophosphate | 0.60 |
| iron stearate masterbatch (for concentration of 15 parts iron stearate per million parts polyethylene) | 1.50 |
| $\alpha$-$\alpha'$-bis(tert-butylperoxy)diisopropylbenzene | 1.50 |
| Total | 103.80 |

EXAMPLE 5

| | Parts |
|---|---|
| Low density polyethylene (nominal melt index) | 100.00 |
| 2,6-dioctadecyl-p-cresol | 0.20 |
| zinc dialkyldithiophosphate | 0.60 |
| nickel stearate masterbatch (for concentration of 15 parts nickel stearate per million parts polyethylene) | 1.50 |
| $\alpha$-$\alpha'$-bis(tert-butylperoxy)diisopropylbenzene | 1.50 |
| Total | 103.80 |

-continued

CONTROL B

| | |
|---|---|
| Ethylene-vinyl acetate copolymer (vinyl acetate content 17%; nominal melt index 2) | 100.00 |
| hydrated alumina | 113.00 |
| titanium dioxide | 2.00 |
| zinc oxide | 3.00 |
| vinyl tris(beta-methoxyethoxy)silane | 1.20 |
| substituted diphenylamine | 0.50 |
| zinc dialkyldithiophosphate | 1.00 |
| aluminum stearate | 1.00 |
| α,α-bis(tert-butylperoxy)diisopropylbenzene | 1.76 |
| Total | 223.46 |

EXAMPLE 6

| | |
|---|---|
| Ethylene-vinyl acetate copolymer | 100.00 |
| hydrated alumina | 113.00 |
| titanium dioxide | 2.00 |
| zinc oxide | 3.00 |
| vinyl tris(beta-methoxyethoxy)silane | 1.20 |
| substituted diphenylamine | 0.50 |
| zinc dialkyldithiophosphate | 1.00 |
| aluminum stearate | 1.00 |
| chromium salt of mercaptobenzothiazole (for concentration of 20 parts chromium salt of mercaptobenzothiazole per million parts ethylene-vinyl acetate copolymer) | 2.00 |
| α,α-bis(tert-butylperoxy)diisopropylbenzene | 1.76 |
| Total | 225.46 |

PHYSICAL PROPERTIES

| Original | Tensile Strength, psi | Elongation at Break, % |
|---|---|---|
| Control A | 2790 | 518 |
| Example 1 | 2820 | 508 |
| Example 2 | 2890 | 516 |
| Example 3 | 2810 | 510 |
| Example 4 | 2840 | 523 |
| Example 5 | 3010 | 522 |
| Aged 14 days at 150°C. | | |
| Control A | 1230 (44) | 133 (26) |
| Example 1 | 2660 (94) | 530 (104) |
| Example 2 | 2680 (93) | 526 (102) |
| Example 3 | 2715 (97) | 535 (105) |
| Example 4 | 2720 (96) | 533 (104) |
| Example 5 | 2840 (94) | 560 (107) |
| Original | | |
| Control B | 2430 | 260 |
| Example 6 | 2500 | 236 |
| Aged 14 days at 160°C. | | |
| Control B | 2060 (85) | 162 (62) |
| Example 6 | 2610 (105) | 214 (91) |

The tensile strength and elongation at break were measured in accordance with ASTM D-412. In the Table, the numbers in parenthesis indicate the percent retention of the property after heat aging.

The physical test data in the Table show that the incorporation of a few parts of the transition metal salt per million parts of polymer markedly improve the heat stability of the compositions as indicated by the great increase in their retention of physical properties upon prolonged exposure to elevated temperatures. For example, the average retention of tensile strength at 14 days exposure to a temperature of 150° C. increased from 44% (Control) to 95% (average for Examples 1, 2, 3, 4 and 5) and the retention of the elongation increased from 26% (Control) to 105% (average for Examples 1, 2, 3, 4 and 5). In the case of the mineral filled ethylene-vinyl acetate copolymer, the retention of tensile strength and elongation after 14 days exposure to a temperature of 160° C. increased from 85% (Control) to 105% and from 62% to 91%, respectively.

Various changes and modifications can be made in the process and products of this invention without departing from the spirit and the scope thereof. The various embodiments set forth herein were for the purpose of further illustrating the invention but were not intended to limit it.

I claim:

1. A composition comprising (a) a resin selected from the group consisting of unfilled low density polyethylene and mineral filled ethylene-vinyl acetate copolymer, (b) an organic peroxide, and (c) about 0.5 to 1.95 parts per hundered parts of polymer of an anti-oxidant composition, said anti-oxidant composition comprising (1) at least one member of the group of hindered phenol and diarylamine, (2) a metal organic thiophosphate and (3) about 1 to 100 parts per million parts of resin of a transition metal salt selected from the group consisting of cobalt stearate, iron stearate, manganese stearate, nickel stearate, and the trivalent chromium salt of mercaptobenzothiazole.

2. The composition of claim 1 wherein said resin is unfilled low density polyethylene and wherein said transition metal salt is employed in an amount of about 1 to 50 parts per million.

3. The composition of claim 2 wherein said transition metal salt is selected from the group consisting of cobalt stearate, iron stearate, manganese stearate and nickel stearate and is employed in an amount of about 10 to 20 parts per million.

4. The composition of claim 3 wherein said amount of stearate salt is about 15 parts per million.

5. The composition of claim 2 wherein said transition metal salt is the trivalent chromium salt of mercaptobenzothiazole and is employed in an amount of about 7 to 13 parts per million.

6. The composition of claim 5 wherein said amount of transition metal salt is about 10 parts per million.

7. The composition of claim 1 wherein said resin is mineral filled ethylene-vinyl acetate copolymer and said transition metal salt is employed in an amount of about 5 to 100 parts per million.

8. The composition of claim 7 wherein said transition metal salt is selected from the group consisting of cobalt stearate, iron stearate, manganese stearate and nickel stearate, and is employed in an amount of about 25 to 35 parts per million.

9. The composition of claim 8 wherein said amount of transition metal salt is about 30 parts per million.

10. The composition of claim 7 wherein said transition metal salt is the trivalent chromium salt of mercaptobenzothiazole and is employed in an amount of about 15 to 25 parts per million.

11. The composition of claim 10 wherein said amount of transition metal salt is about 20 parts per million.

12. In a method of stabilizing a composition comprising crosslinkable unfilled low density polyethylene or mineral filled ethylene-vinyl acetate and a peroxide curing agent by adding an anti-oxidant composition thereto, the improvement which comprises employing about 0.5 to 1.95 parts of an anti-oxidant composition comprising (a) at least one member of the group of hindered phenol and diarylamine, (b) a metal organic thiophosphate, and (c) about 1 to 100 parts per million parts of polymer of a transition metal salt selected from the group consisting of cobalt stearate, iron stearate, manganese stearate, nickel stearate, and the trivalent chromium salt of mercaptobenzothiazole.

13. The method of claim 12 wherein said low density polyethylene is stabilized and wherein 1 to 50 parts per million of said transition metal salt is employed.

14. The method of claim 13 wherein the amount of said cobalt stearate, iron stearate, manganese stearate or nickel stearate is in the range of about 10 to 20 parts per million and the amount of said trivalent chromium salt is in the range of about 7 to 13 parts per million.

15. The method of claim 14 wherein the amount of said stearate salt is about 15 parts per million and the amount of said chromium salt is about 10 parts per million.

16. The method of claim 12 wherein mineral filled ethylene-vinyl acetate is stabilized and wherein about 5 to 100 parts of said transition metal salt is employed.

17. The method of claim 16 wherein said cobalt stearate, iron stearate, manganese stearate or nickel stearate is used is an amount of about 25 to 35 parts per million and said chromium salt is used in an amount of about 15 to 25 parts per million.

18. The method of claim 17 wherein said stearate salts are used in an amount of about 30 parts per million and said chromium salt is used in an amount of about 20 parts per million.

19. The method of claim 16 wherein about 1.05 to 1.95 parts of anti-oxidant composition is employed.

20. The composition of claim 13 wherein about 0.5 to 1 part of anti-oxidant composition is employed.

* * * * *